United States Patent
Paulussen et al.

(10) Patent No.: US 8,356,902 B2
(45) Date of Patent: Jan. 22, 2013

(54) AMBIENT LIGHTING FOR AN IMAGE DISPLAY

(75) Inventors: Elvira Johanna Maria Paulussen, Reppel-Bocholt (BE); Vlatko Milosevski, Eindhoven (NL); Egbert Lenderink, Eindhoven (NL); Lingli Wang, Bad Kreuznach (DE); Joseph Ludovicus Antonius Maria Sormani, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 323 days.

(21) Appl. No.: 12/676,627

(22) PCT Filed: Sep. 8, 2008

(86) PCT No.: PCT/IB2008/053621
§ 371 (c)(1),
(2), (4) Date: Mar. 5, 2010

(87) PCT Pub. No.: WO2009/034513
PCT Pub. Date: Mar. 19, 2009

(65) Prior Publication Data
US 2010/0208211 A1  Aug. 19, 2010

(30) Foreign Application Priority Data
Sep. 11, 2007  (EP) .................................. 07116121

(51) Int. Cl.
*G03B 21/26* (2006.01)
*G03B 21/28* (2006.01)
*F21V 5/00* (2006.01)
*H04N 9/31* (2006.01)
*G02B 17/00* (2006.01)

(52) U.S. Cl. .............. 353/29; 353/30; 353/99; 362/245; 348/744; 359/726

(58) Field of Classification Search .................... 353/29, 353/30, 98, 99; 362/245; 348/744; 359/726
See application file for complete search history.

(56) References Cited

U.S. PATENT DOCUMENTS
(Continued)

FOREIGN PATENT DOCUMENTS
EP    1548571 A1    6/2005
WO    2004112386 A1    12/2004
(Continued)

OTHER PUBLICATIONS

AV Science Forum: "DIY Ambilight for Projector Screen"; Discussion on Making Ambilight Behind a Projector Screen Using Rope Light, Downloaded on Jun. 1, 2006 From http://www.avsforum.com/avs-vb/showthread.php?t=712133, 4 Page Document.

Primary Examiner — Georgia Y Epps
Assistant Examiner — Magda Cruz

(57) ABSTRACT

A system comprises means (PL; MI) for projecting an image light beam (ILB) on a projection area (PA) for display of an image (PI) on the projection area (PA), and means (1) for generating an ambient light beam (ALB; ALB1, ALB2) and comprising: an ambient light source (LS; LS1, LS2) for generating ambient light, a collimator (CO) or a light-guide (LG1, LG2) for receiving the ambient light to supply the ambient light beam (ALB; ALB1, ALB2), and a reflector (RF; RF1, RF2) for reflecting the ambient light beam (ALB; ALB1, ALB2) towards the projection area (PA) to obtain an ambient lighting area (ALI) adjacent the image (PI).

14 Claims, 3 Drawing Sheets

U.S. PATENT DOCUMENTS

| | | |
|---|---|---|
| 7,040,764 B2 | 5/2006 | Przybyla et al. |
| 7,071,897 B2 | 7/2006 | Bronson |
| 7,180,529 B2 | 2/2007 | Covannon et al. |
| 7,180,663 B2 | 2/2007 | Collender et al. |
| 7,513,642 B2 * | 4/2009 | Sormani ................ 362/245 |
| 2003/0016236 A1 | 1/2003 | Bronson |
| 2005/0041164 A1 | 2/2005 | Sato |
| 2005/0195373 A1 | 9/2005 | Feigel et al. |
| 2006/0126028 A1 | 6/2006 | Ullman |
| 2011/0175934 A1 * | 7/2011 | Paulussen et al. ............ 345/690 |

FOREIGN PATENT DOCUMENTS

| | | |
|---|---|---|
| WO | 2005062608 A2 | 7/2005 |
| WO | 2006033040 A1 | 3/2006 |
| WO | 2006033042 A1 | 3/2006 |

\* cited by examiner

AMBIENT LIGHTING FOR AN IMAGE DISPLAY

FIELD OF THE INVENTION

The invention relates to a system which projects both an image light beam and an adjacent ambient light beam on a projection area. The invention further relates to a front projector which comprises such a system.

BACKGROUND OF THE INVENTION

U.S. Pat. No. 7,071,897 B2 discloses a display system for displaying images of high resolution on a main screen, and augmentation images in augmentation regions located around the main screen. The viewing experience is enhanced by the presence of the augmentation images because of the increase in visual information conveyed to the viewers. The augmentation regions lie outside the foveal field of view of the viewers, so the augmentation images can be of lower resolution than the high resolution images displayed on the main screen. In an embodiment of this prior art, the display system comprises a main projector which projects the high resolution images on the main screen, a left and right panel projector which project the low resolution images on left and right panel screens flanking the main screen at left and right sides, respectively. This embodiment further comprises first and second right side and first and second left side light sources to project light on the side walls of the room, and left and right ceiling light sources to project light on the ceiling of the room.

Such a setup requires three separate projectors and several separate further light sources and thus is complicated and big.

SUMMARY OF THE INVENTION

It is an object of the invention to provide a system which is able to project ambient light adjacent an image of a front projector, which system is compact and easy to use.

A first aspect of the invention provides a system as claimed in claim 1. A second aspect of the invention provides a front projector as claimed in claim 13. Advantageous embodiments are defined in the dependent claims.

A system in accordance with the first aspect of the invention projects an image light beam on a projection area to display an image on the projection area. The image may be any information such as for example a photograph, video, or computer generated information. The image may be obtained from a storage medium or may be a received broadcast. An ambient light generator, which generates an ambient light beam, comprises an ambient light source, a collimator or a light-guide, and a reflector. The ambient light source generates ambient light. The collimator or the light-guide receives the ambient light generated by the ambient light source at an input window and supplies the ambient light beam which is reflected towards the projection area via the reflector. The reflected ambient light beam impinges on an ambient lighting area adjacent the image.

The use of a collimator or a light-guide together with a reflector provides a compact solution.

In an embodiment, the ambient light source comprises a LED (Light Emitting Diode) emitting light with a single color, or a plurality of LED's emitting different colors.

In an embodiment, the system comprises a projection lens to project the image light beam on the projection area. The ambient light generator is arranged at least partly around the projection lens. For example, the ambient light generator may only produce an ambient lighting at the left or right side of the image projected via the projection lens. Alternatively, the ambient light generator may produce an ambient lighting at the top of bottom of the projected image, or the ambient lighting may surround the projected image. By arranging the ambient light generator around the projection lens, a practical solution for a front projector with projection lens is obtained. The alignment of the ambient light beam with respect to the image beam is relatively easy.

In an embodiment, the ambient light generator comprises a collimator. The ambient light source, the collimator and the reflector are arranged such that the ambient light source is nearest to the projection lens, and the collimator is in-between the ambient light source and the reflector.

In an embodiment, the collimator and reflector are designed to obtain a sharp cut-off at a border of the ambient lighting area adjacent the image to minimally disturb the projected image by the ambient light beam. Such collimator and reflector designs are known as such from the International Publications WO 2006/033040 and WO 2006/033042.

In an embodiment, the ambient light generator is arranged in parallel with a plane of the projection lens, or in the plane of the projection lens. The plane of the projection lens is defined as a plane through the projection lens, which plane extends substantially perpendicular to the image light beam traversing the projection lens. It is relatively easy to align such an ambient light generator with respect to the projection lens.

In an embodiment, a mirror is used to project the image light beam. A front projector using a mirror is as such known from WO 2004/112386. The image light beam is reflected by a front plane of the mirror towards the projection area. The ambient light generator comprises the light guide which is arranged at least partly at a back plane of the mirror. At the back plane of the mirror ample space is available to support the ambient light generator. Further, if the ambient light generator is attached to the mirror, the alignment of the ambient light beam with respect to image area is simple. The light guide may be a single light guide which ends at least partly along one side of the mirror to provide ambient light at the associated side of the image. Alternatively, two or more light guides may be used to obtain ambient light at more than one side of the image.

In an embodiment, the light-guide is arranged in parallel with the back plane and protrudes with a protruding part at least partly from behind the back plane. The protruding part comprises a light output window. The light-guide receives the ambient light emitted by the ambient light source at an input window and supplies the ambient light beam to the reflector. The reflector reflects the ambient light beam via the output window towards the projection area.

In an embodiment, the length of the light guide is substantially identical to a length of the back plane of the mirror to obtain an optimal mixing of the ambient light radiated by ambient light source if differently colored light emitters are used.

In an embodiment, the light guide is shaped to have an increasing width defined in a direction parallel to the back plane and perpendicular to a direction extending from the ambient light source towards the reflector. Such a shape has the advantage that total internal reflection is maintained. Alternatively, or in addition, the width may increase in the direction extending from the ambient light source towards the reflector in a direction perpendicular to the back plane.

In an embodiment, the ambient light source comprises a plurality of differently colored light emitters. The different colors may be selected such that it is possible to generate white light. The different colors may be selected to correspond to the primaries of the pixels of a display panel which generates the to be projected image to obtain an optimum match between the colors which can be generated by the ambient lighting and the colors of the projected image.

In an embodiment, the system comprises adjustment provisions enabling an adjustment of a position of the ambient light area with respect to a center of the image. This enables to obtain a correct position of the ambient light area for different dimensions of image. The different dimensions of the image are due to the use of different projectors, a different distance of a particular projector to the projection area, or zooming the image to be projected.

In an embodiment, the adjustment provisions apply a tilt to the collimator, the light-guide or the reflector.

In an embodiment, the ambient light generator is an integral part of a front projector. This integral part may be positioned inside the cabinet of the front projector or may be factory (or by a service action) attached to the projection lens or mirror. There is no need for the user to align the system.

In an embodiment, the ambient light generator is a separate accessory for the front projector. The accessory may be attached to the front projector by the user.

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
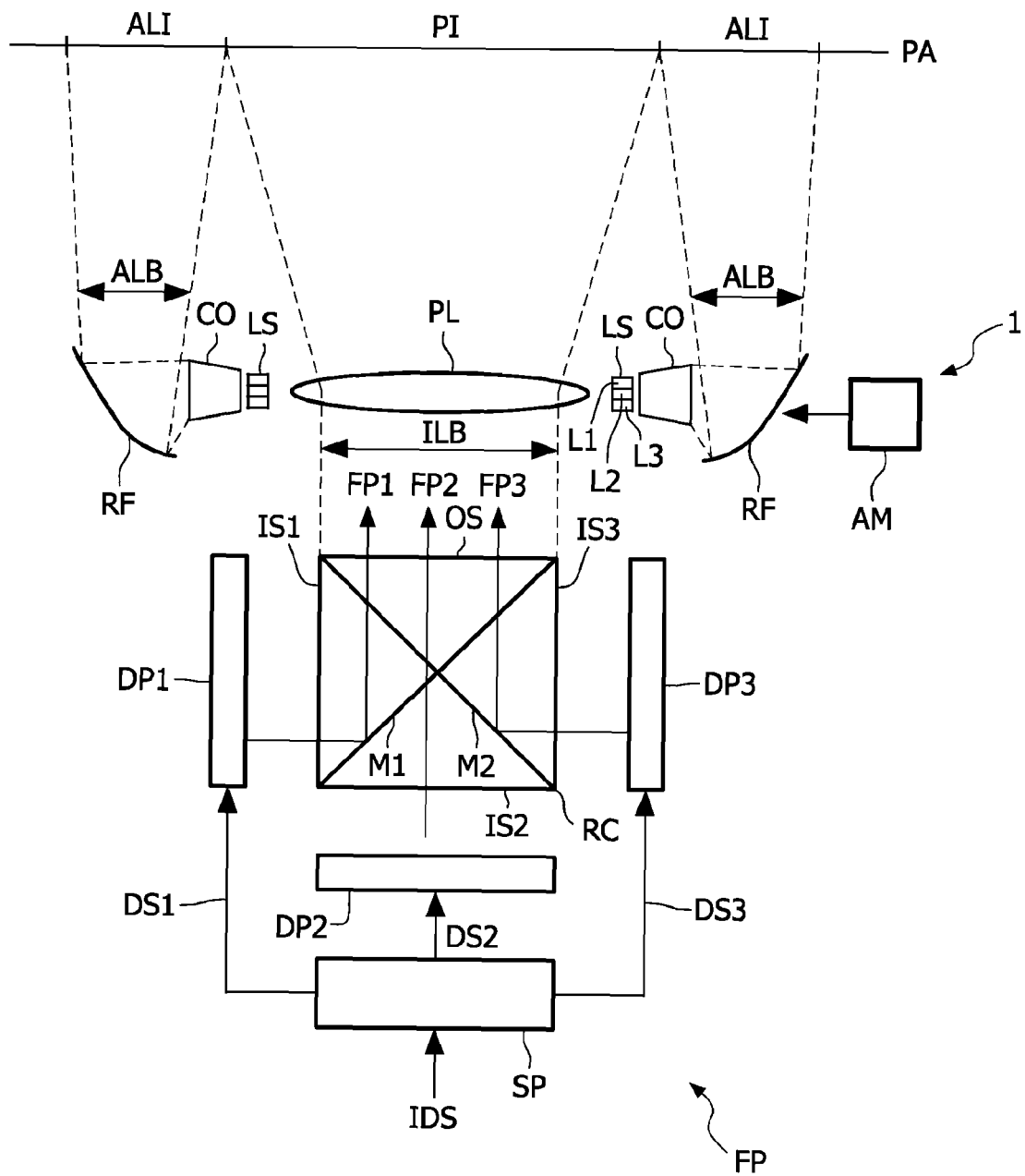
FIG. 1 schematically shows an embodiment of a front projector with a projection lens, FIG. 2 schematically shows an embodiment of a front projector with a projection mirror, FIG. 3 schematically shows an embodiment of a light guide, and FIG. 4 schematically shows another embodiment of an ambient light generator using a light guide.

FIG. 1 schematically shows an embodiment of a front projector with a projection lens. The front projector FP comprises three display panels DP1, DP2 and DP3, a recombination cube RC (in literature also referred to as X-prism), an ambient light source LS, a projection lens PL, and a signal processor SP.

By way of example, this embodiment will be explained by assuming that the display panel DP1 provides the red part FP1 of the image, the display panel DP2 the green part FP2 and the display panel DP3 the blue part FP3. However, any other set of primary colors instead of red, green and blue may be used as well. The light sources illuminating the display panel DP1, DP2 and DP3 are not shown.

The red image part FP1 generated by the display panel DP1 enters the recombination cube RC at its input side IS1 and is reflected by the semi transparent color reflector M1 which reflects red light and transmits green light. Thus, the red light originating from the display panel DP1 is reflected by the semi transparent color reflector M1 towards the output side OS of the recombination cube RC. The blue image part FP3 generated by the display panel DP3 enters the recombination cube RC at its input side IS3 and is reflected by the semi transparent color reflector M2 which reflects blue light and transmits green light. Thus, the blue light originating from the display panel DP3 is reflected by the semi transparent color reflector M2 towards the output side OS of the recombination cube RC. The green light originating from the display panel DP2 passes through both the semi transparent color reflectors M1 and M2 and also leaves the recombination cube RC at the output side OS. The image beam ILB is projected by the projection lens PL on the as the image PI on the projection area PA.

In the embodiment shown, the ambient light source LS is arranged around the projector lens LS and emits ambient light into the input side of a collimator CO. The ambient light beam leaves the collimator CO at its output side which is directed towards a reflector RF. The reflector RF is shaped to reflect the ambient light beam which leaves the collimator CO as the ambient light beam ALB towards the projection area PA. Preferably, the ambient light beam is projected to illuminate the ambient light areas ALI directly adjacent to the projected image PI. However, a gap may be present between the projected image PI and the ambient light areas ALI.

It has to be noted that the ambient light source LS, the collimator and the reflector mentioned surround the projector lens LS, for example as a ring shape or as a square shape corresponding to the straight sides of the display panels DP1, DP2 and DP3. Further, it has to be noted that when ambient light is mentioned, it is meant the light generated by the ambient light source(s) and not the light present in the ambient surroundings of the front projector FP.

The ambient light source LS, the collimator CO and the reflector RF must not extend over a complete circle. For example, if only ambient light has to be generated at the left and right sides of the projected image PI, two light sources LS, two collimators CO, and two reflectors RF may be used at opposite sides of the projection lens PL. Now, the reflectors RF may form two opposite sides of a rectangle. If the ambient light has to be generated at both the left and right sides and the top and bottom sides of the projected image PI, four light sources LS, collimators CO and reflectors RF may be used instead of a single one which is arranged in a rectangle.

The collimator and reflector may be designed to obtain a sharp cut-off at a border of the ambient lighting area adjacent the image to minimally disturb the projected image by the ambient light beam. Such collimator and reflector designs are known as such from the International Publications WO 2006/033040 and WO 2006/033042.

As shown in FIG. 1, the combination of the ambient light source(s) LS, the collimator(s) CO and the reflector(s) RF may be arranged in a plane perpendicular to the image light beam ILB (or in parallel with the output side OS of the recombination cube RC). Preferably, this plane runs through the projection lens PL. The ambient light source LS is arranged nearest to the side of the projection lens PL, and the collimator CO is positioned in-between the ambient light source LS and the reflector RF. This arrangement has the advantage that the combination of the ambient light source LS, the collimator CO and the reflectors can be directly or indirectly attached to the projection lens PL and provide the ambient light to be projected in the same plane as the image to be projected.

It has to be noted that the arrangement of the ambient light source LS and the collimator CO must not lie in the previously defined perpendicular plane. For example the light beam leaving the collimator CO may have an angle with this plane. For example, the light source LS may be positioned nearer to the recombination cube RC than the collimator CO.

The reflector RF has to be adapted correspondingly to still project the ambient light beam ALB on the same position on the display area PA.

The signal processor SP supplies drive signals DS1, DS2 and DS3 to the display panels DP1, DP2 and DP3, respectively to control the transmission of their pixels in accordance with the input image signal IDS. Because three display panels DP1, DP2 and DP3 are used, the red, green and blue pixels may be generated coincidently. If a single display panel is present the red, green and blue sub-images may be generated time sequentially, for example by sequentially changing the color of the light impinging on the single display panel. The recombination cube RC is superfluous if a single display panel is used.

An adjuster AM is mechanically coupled to the reflector RF to tilt the reflector RF to change the position of the ambient light area ALI. Alternatively, instead or in addition to, the adjuster AM may be mechanically coupled to the collimator CO to tilt the collimator. The reflector RF may be a mechanically separate mirror which can be tilted separately from the collimator CO. Alternatively, the whole assembly of ambient light source LS, collimator CO and reflector RF may be tilted.

Figure 2:
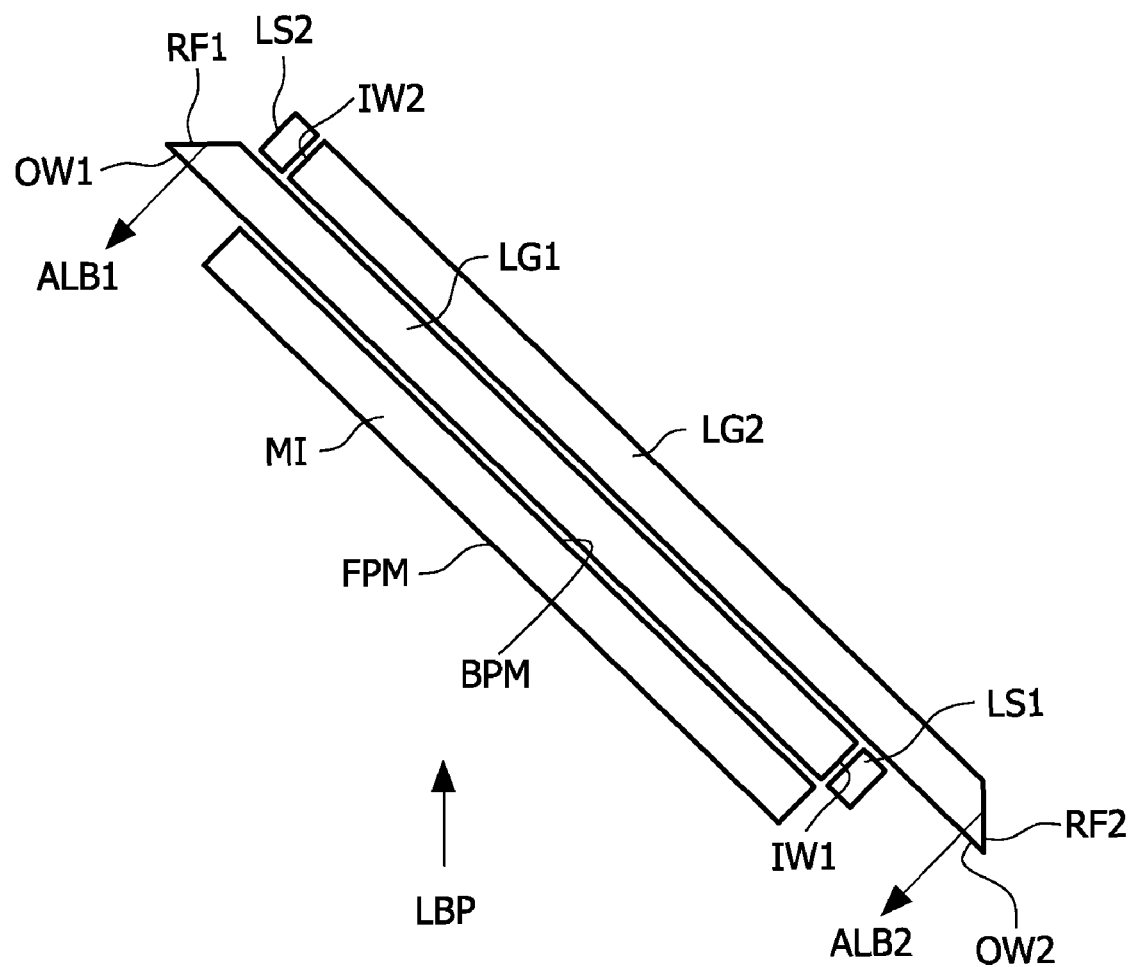

FIG. 2 schematically shows an embodiment of a front projector with a projection mirror. The front projector comprises a projection unit (not shown) which generates an image which is projected on the projection area PI via the mirror MI. A front projector using such a projection unit and a mirror is disclosed in WO 2004/112386. The relevant issue of the present invention is that an ambient light generator is attached to the mirror MI. The light beam from the projector is indicated by LBP. With respect to this type of front projectors other features than the mirror MI are not discussed because they are not relevant for the understanding of the present invention.

The mirror MI has a front plane FPM which is reflective and thus reflects the image light beam towards the projection area PA. The mirror MI has a back plane BPM opposite to the front plane FPM. A stack of a first combination and a second combination of an ambient light source and a light-guide are arranged at the back plane BPM and in parallel with the back plane BPM. The first combination comprises a light source LS1 and a light-guide LG1, and the second combination comprises a light source LS2 and a light-guide LG2.

The light-guide LG1 has a light input window IW1 near or at a particular edge of the mirror MI, and a reflector RF1 is arranged at an edge of the mirror MI opposite to the particular edge. The ambient light source LS1 is provided at the light input window of the light-guide LG1. The light-guide LG1 has to protrude from behind the back plane of the mirror MI such that the reflector RF1 is able to reflect the light in the light-guide LG1 via an output window OW1 towards the projection area PA. The ambient light beam leaving the output window OW1 is referred to as ALB1. In the embodiment shown, the reflector RF1 is arranged under an angle of 45 degrees with the back plane BPL and the output window OW1 extends in parallel with the back plane BPM. The actual orientation of the reflector RF1 and the output window OW1 may be selected differently. What counts is that the ambient light beam ALB1 is directed to the desired area.

The second light-guide LG2 has a light input window IW2 near or at the edge opposite to the particular edge, and the reflector RF2 is arranged at the particular edge. The ambient light source LS2 is provided at the light input window of the light-guide LG2. The light-guide LG2 has to protrude from behind the back plane of the mirror MI such that the reflector RF2 is able to reflect the light in the light-guide LG2 via an output window OW2 towards the projection area PA. The ambient light beam leaving the output window OW2 is referred to as ALB2. In the embodiment shown, the reflector RF2 is arranged under an angle of 45 degrees with the back plane BPL and the output window OW2 extends in parallel with the back plane BPM. The actual orientation of the reflector RF2 and the output window OW2 may be selected differently.

The ambient light sources LS1 and LS2 may comprise a plurality of differently colored LED's.

Although not shown, an adjuster (AM in FIG. 1) may be mechanically coupled with the reflector RF1, RF2 if the reflector is mechanically separated from the collimator CO. Or alternatively the adjuster AM may be mechanically coupled with the light guide LG1, LG2 if the reflector RF1, RF2 is one part with the light-guide LG1, LG2. Alternatively, the adjuster AM may be mechanically coupled with both the light-guide LG1, LG2 and the reflector RF1, RF2 to tilt the reflector and light-guide to adjust the position of the ambient light area ALI. The adjuster AM may tilt the assembly of the light source, the collimator, the light guide and the reflector. The reflector may be one part with the light-guide.

In an embodiment, the assembly shown in FIG. 2 is rotated over 90 degrees around the central axis perpendicular to the mirror surface, such that the ambient light is projected at left and right sides of the image instead at top and bottom sides. Alternatively, the ambient light may be provided at top, bottom, left and right sides of the mirror surface.

Figure 3:
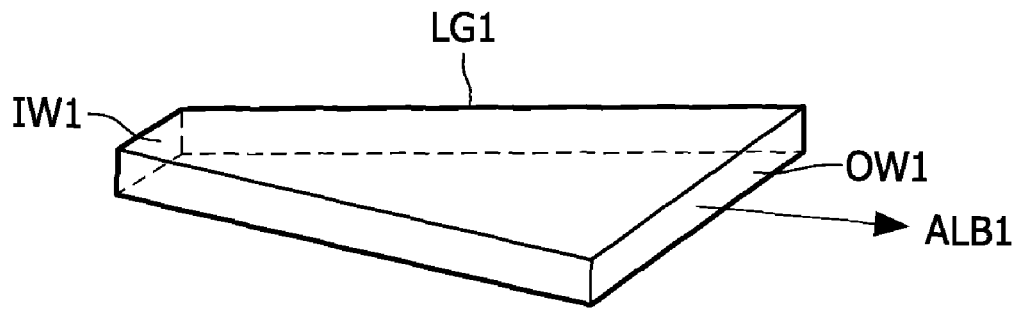

FIG. 3 schematically shows an embodiment of a light guide. The light guide LG1 shown in FIG. 3 may be attached to the back plane BPM of the mirror MI as shown in FIG. 2. The light-guide LG1 has a trapezoidal shape with an input window IW1 which is relatively small with respect to the output window OW1. The dimensions of the input window IW1 are related the dimensions and number of light emitters used in the light source LS1. The dimensions of the output window OW1 are defined by the dimensions of the area to be covered by the ambient light beam ALB1. The trapezoidal shape has the advantage that total internal reflection is maintained.

Alternatively or additionally, the light guide LG1 may also become wider in the direction from the ambient light source LS1 towards output window OW1 in a direction perpendicular to the mirror surface. For example, the width of the input window IW1 is 2 mm and the width of the output window OW1 is 7 mm.

The light guide LG2 shown in FIG. 2 may have the same shape but has its input window IW2 near the output window OW1 and its output window OW2 near to the input window IW1.

Figure 4:
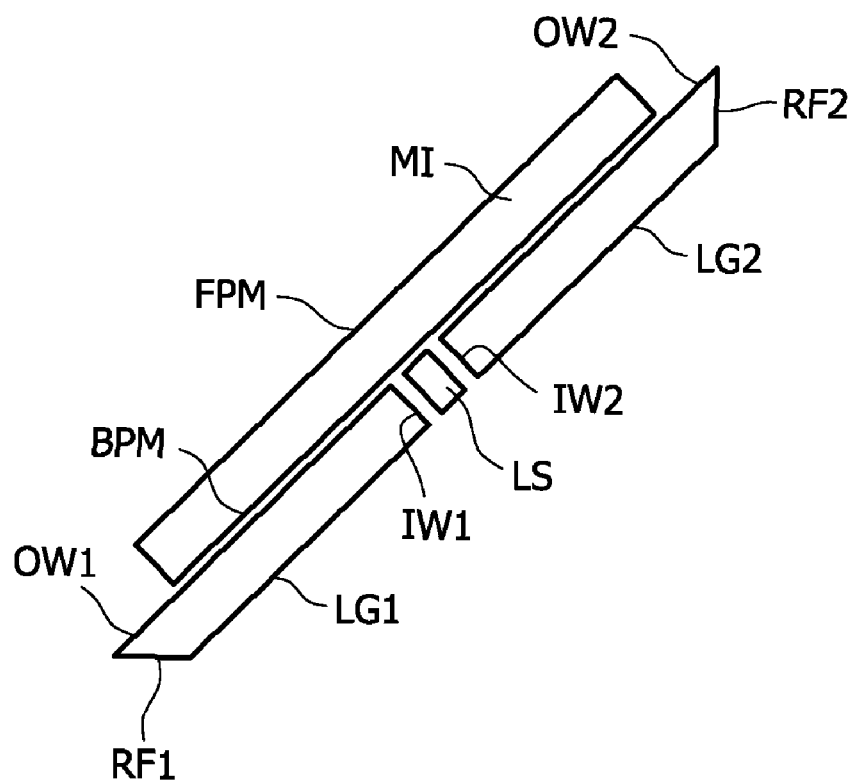

FIG. 4 schematically shows another embodiment of an ambient light generator using light-guides. The light-guides LG1 and LG2 are now arranged in the same plane and are both attached to the back plane BPM of the mirror MI. An ambient light source LS is arranged in-between the two light-guides LG1, LG2 and emits light into both input windows IW1 and IW2 of the light guides LG1 and LG2, respectively. Instead of a single ambient light source LS, different light sources may be used for the different light-guides LG1, LG2 such that the color and intensity may be controlled separately. Again, as shown in FIG. 2, the light-guide LG1 has a reflector RF1 and an output window OW1 protruding from behind the mirror MI. In the same manner, the light-guide LG2 has a reflector RF2 and an output window OW2 protruding from behind the mirror MI.

It has to be noted that the light guide may have a bent shape. For example, if the ambient light source LS has to be inputted into two or more light guides, these light guides may have input windows in parallel to the mirror surface and than have to bent to extend towards the edges of the mirror.

It should be noted that the above-mentioned embodiments illustrate rather than limit the invention, and that those skilled in the art will be able to design many alternative embodiments without departing from the scope of the appended claims. For example, the color and/or luminance of the ambient light sources may be modulated to obtain an ambient light fitting the content of the projected image PI. The color and the intensity of ambient light sources generating the ambient light beam adjacent different sides of the projected image may be controlled differently, for example to vary in accordance with the image content near to the associated border.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system comprising:
    means (PL; MI) for projecting an image light beam (ILB) on a projection area (PA) for display of an image (PI) on the projection area (PA), and
    means (1) for generating an ambient light beam (ALB; ALB1, ALB2) and comprising:
    an ambient light source (LS; LS1, LS2) for generating ambient light,
    a collimator (CO) or a light-guide (LG1, LG2) for receiving the ambient light to supply the ambient light beam (ALB; ALB1, ALB2), and
    a reflector (RF; RF1, RF2) for reflecting the ambient light beam (ALB; ALB1, ALB2) towards the projection area (PA) to obtain an ambient lighting area (ALI) adjacent the image (PI).

2. A system as claimed in claim 1, wherein the means for projecting (PL; MI) the image light beam (ILB) comprises a projection lens (PL), and wherein the means (1) for generating the ambient light beam (ALB) is arranged at least partly around the projection lens (LS).

3. A system as claimed in claim 2, wherein the means (1) for generating the ambient light beam (ALB) comprises the collimator (CO), and wherein the ambient light source (LS), the collimator (CO) and the reflector (RF) arrangement is arranged in that the ambient light source (LS) is nearest to the projection lens (PL), and the collimator (CO) is in-between the ambient light source (LS) and the reflector (RF).

4. A system as claimed in claim 3, wherein the collimator (CO) and the reflector (RF) are designed to obtain a sharp cut-off at a border of the ambient lighting area (ALI) adjacent the image (PI).

5. A system as claimed in claim 2, wherein means (1) for generating the ambient light beam (ALB) is arranged in parallel with, or in, a plane of the projection lens PL, wherein the plane extends substantially perpendicular to the image light beam (ILB).

6. A system as claimed in claim 1, wherein the means for projecting (PL; MI) the image light beam (ILB) comprises a mirror (MI) and wherein the image light beam (ILB) is reflected by a front plane (FPM) of the mirror (MI) towards the projection area (PA), and wherein the means (1) for generating the ambient light beam (ALB1, ALB2) comprises the light guide (LG1, LG2) being arranged at least partly at a back plane (BPM) of the mirror (MI).

7. A system as claimed in claim 6, wherein the light-guide (LG1, LG2) is arranged in parallel with the back plane (BPM) and protrudes with a protruding part at least partly from behind the back plane (BPM), the protruding part comprising an output window (OW1, OW2), wherein the light-guide (LG1, LG2) is arranged for receiving the ambient light emitted by the ambient light source (LS1, LS2) to supply the ambient light beam (ALB1, ALB2) to the reflector (RF1, RF2), the reflector (RF1, RF2) being arranged for reflecting the ambient light beam (ALB1, ALB2) via the output window (OW1, OW2) towards the projection area (PA).

8. A system as claimed in claim 7, wherein a length of the light guide (LG1, LG2) is substantially identical to a length of the back plane (BPM) of the mirror (MI).

9. A system as claimed in claim 7, wherein the light guide (LG1, LG2) is shaped to have an increasing width defined in a direction parallel to the back plane (BPM) and perpendicular to a direction extending from the ambient light source (LS1, LS2) towards the reflector (RF1, RF2) and/or in a direction perpendicular to the back plane (BPM).

10. A system as claimed in claim 1, wherein the ambient light source (LS; LS1, LS2) comprises a plurality of differently colored light emitters (L1, L2, L3).

11. A system as claimed in claim 1, further comprising means for adjusting a position of the ambient light area (ALI) with respect to a center of the image (PI).

12. A system as claimed in claim 11, wherein the means for adjusting comprises means for tilting any one separately, or any combination of: the collimator (CO), the light-guide (LG1, LG2), the reflector (RF; RF1, RF2), the ambient light source (LS; LS1, LS2).

13. A front projector comprising the system of claim 1, wherein the means (1) for generating the ambient light beam (ALB; ALB1, ALB2) is an integral part of the front projector.

14. A front projector comprising the system of claim 1, wherein the means (1) for generating the ambient light beam (ALB; ALB1, ALB2) is a separate accessory for the front projector.

* * * * *